United States Patent [19]

Dattilo

[11] 4,384,874
[45] May 24, 1983

[54] DUST CONTROL APPARATUS WITH CLEANING CONTROL CIRCUIT

[76] Inventor: Donald P. Dattilo, 2302 Taylorsville Rd., Louisville, Ky. 40205

[21] Appl. No.: 252,856

[22] Filed: Apr. 10, 1981

[51] Int. Cl.³ .............................................. B01D 46/04
[52] U.S. Cl. ...................................... 55/273; 55/287; 55/302; 55/385 D; 299/12; 175/66
[58] Field of Search .................. 55/96, 273, 286, 287, 55/302, 385 D; 210/411, 412; 299/12; 175/66; 307/223 R, 269, 480, 596; 328/72, 103

[56] References Cited

U.S. PATENT DOCUMENTS

| | | | |
|---|---|---|---|
| 2,985,771 | 5/1961 | Halpern | 307/269 |
| 3,053,030 | 9/1962 | Smith | 55/273 |
| 3,102,208 | 8/1963 | Reach, Jr. | 307/269 |
| 3,303,416 | 2/1967 | Paice et al. | 307/269 |
| 3,581,115 | 5/1971 | Weber | 328/72 |
| 3,582,686 | 6/1971 | Perkins | 307/269 |
| 3,630,004 | 12/1971 | Adair et al. | 55/286 |
| 3,680,285 | 8/1972 | Wellan et al. | 55/302 |
| 3,721,908 | 3/1973 | Jurjans | 307/596 |
| 3,893,833 | 7/1975 | Ulvestad | 55/273 |
| 4,173,722 | 11/1979 | Detering | 307/269 |
| 4,191,998 | 3/1980 | Carmody | 307/269 |
| 4,223,748 | 9/1980 | Barendsen | 175/66 |

FOREIGN PATENT DOCUMENTS

| | | | |
|---|---|---|---|
| 2302632 | 9/1976 | France | 328/103 |
| 455489 | 3/1975 | U.S.S.R. | 328/103 |
| 557507 | 6/1977 | U.S.S.R. | 328/103 |

*Primary Examiner*—David L. Lacey
*Attorney, Agent, or Firm*—Diller, Ramik & Wight

[57] ABSTRACT

This disclosure relates to a dust control apparatus including mobile drilling rig having a peripheral skirt which collects dust during a drilling operation and delivers the same to a dust collector having a chamber housing and a plurality of filters, each filter being cleaned by a high pressure air line through an appropriate solenoid valve and a sequencing control circuit for operating the solenoid valves to sequentially deliver high pressure air into the filters so that the dust collected thereon can be blown therefrom dropping into the chamber and outwardly therefrom through a discharge opening.

10 Claims, 5 Drawing Figures

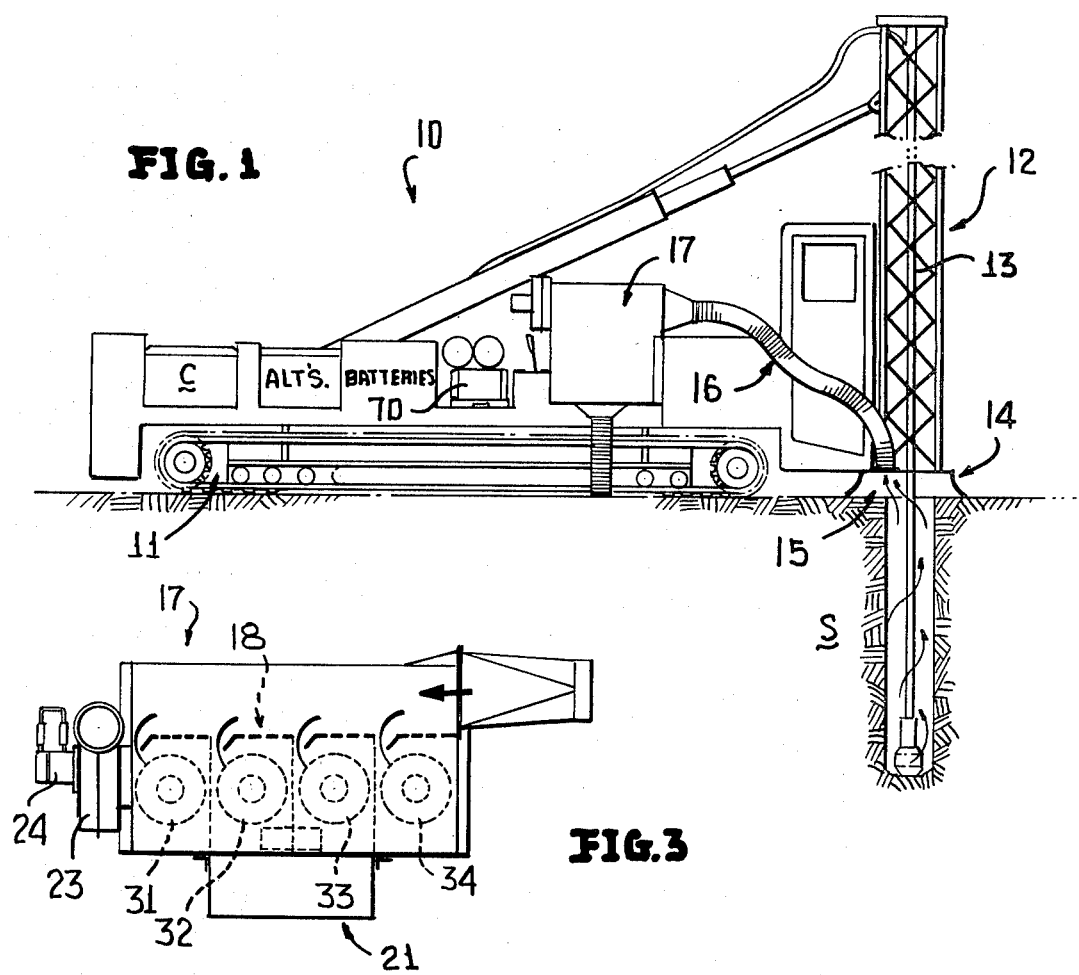
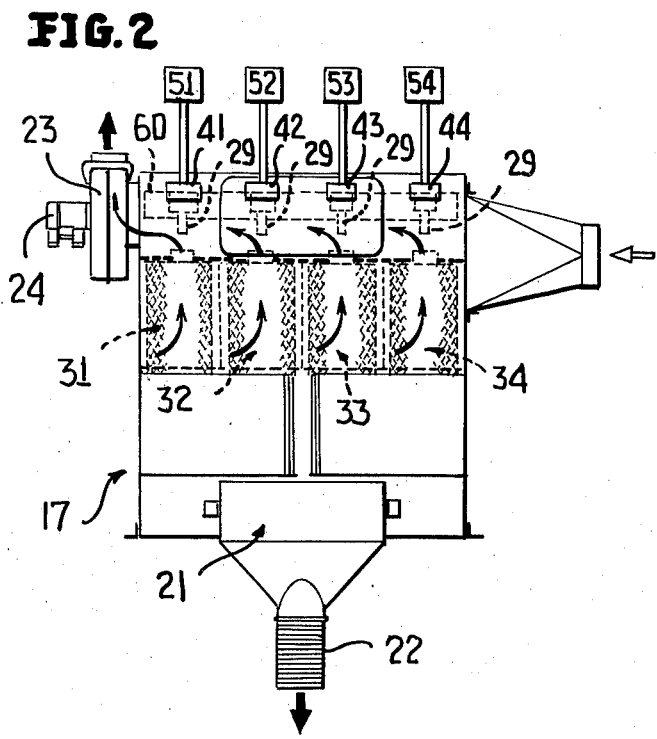
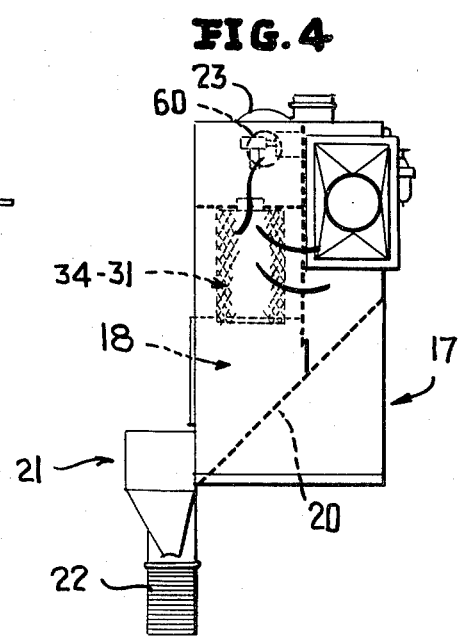

DUST CONTROL APPARATUS WITH CLEANING CONTROL CIRCUIT

The present invention is directed to an apparatus or mechanism for collecting dust during a drilling operation to ease the friction generated during said operation and to provide an environmental condition conducive to good health and legal practices. Such mobile drilling rigs generally include a movable tower that is raised to a vertical position for drilling. In a strip mine operation, a succession of bore holes are drilled for dynamite and during such drilling operation, a tremendous amount of dust is generated, and the present invention relates to a system for collecting the generated dust in a unique fashion by initially utilizing a peripheral skirt which surrounds the area of the bore or hole being drilled and includes an outlet connected to a conduit which in turn is connected to a dust collecting chamber or receiver of the mobile drilling rig. A fan which is generally hydraulically driven creates negative pressure to draw the dust from the area of the skirt into the chamber of the dust collector in which are a plurality of relatively large filters, each located in close proximity to an associated air valve and a solenoid operated valve connected to a high pressure air line. As the dust is drawn into the dust collecting chamber, it collects on the outer surface of the filters. At a preset time and in a preset sequence between such times, the solenoid valves are actuated sequentially to deliver high pressure air through the air valves into hollow cores of the filters, and this sudden blast of air pressure blows the excess dust off the filters which drops to the bottom of the dust collecting chamber which is slanted and exhaust through an appropriate opening and hose to atmosphere (on the ground) where it can be subsequently collected.

In further accordance with this invention, the overall dust collector system includes a sequencing control circuit formed of a number of conventional TTL integrated circuits including timer means for generating timing pulses, counter means for receiving the timing pulses and generating therefrom reoccuring groups of coded pulses with each group corresponding to a filter which is to be cleaned, decoder means for receiving the groups of coded pulses and generating an output drive pulse corresponding to each filter which is to be cleaned, means for generating successive on-time pulses of predetermined time lengths, and gate means for receiving each on-time pulse and an associated output drive pulse for generating successive output pulses of a predetermined time length for sequence controlling the operation of the solenoid valves associated with the filters to open the air valves, thus cleaning the filters in a predetermined sequence.

A further objective of this invention is to provide a novel dust collecting apparatus of the type just defined including as part of the associated circuit means for varying the timed length of the timing pulses to permit the apparatus to be utilized with at least two different air sources (30 psi or 60 psi), and means for selectively resetting the counter depending upon a preselected number of the groups of coded pulses being generated by the counter means to change the sequence of operation of the filters.

Yet another object of this invention is to provide a novel dust collecting mechanism which includes a plurality of buffered NAND gates, one per filter, and a Darlington transistor associated with each NAND gate for energizing the associated solenoid of an associated filter in conjunction with a common source of D.C. voltage.

Still another objective of this invention is to provide a novel dust collecting mechanism including a circuit designed therefor wherein means are provided between the output of each transistor and the associated common voltage supply to preclude reverse voltage damage or short circuit damage to the transistors.

With the above and other objectives in view that will hereinafter appear, the nature of the invention will be more clearly understood by reference to the following detailed description, the appended claims and the several views illustrated in the accompanying drawings.

In the drawings

FIG. 1 is a side elevational view of a mobile drilling rig, and illustrates a dust collector for collecting dust drawn from a bore hole during a drilling operation.

FIG. 2 is a side elevational view of the dust collector, and illustrates a plurality of filters, therein upon which dust gathers.

FIG. 3 is a top view of the dust collector, and illustrates an inlet louver to individual filter chambers.

FIG. 4 is an end elevational view, and illustrates an internal slanted bottom wall along which dust collects and exits from the dust collector through an associated flexible dump flap.

Figure 5:
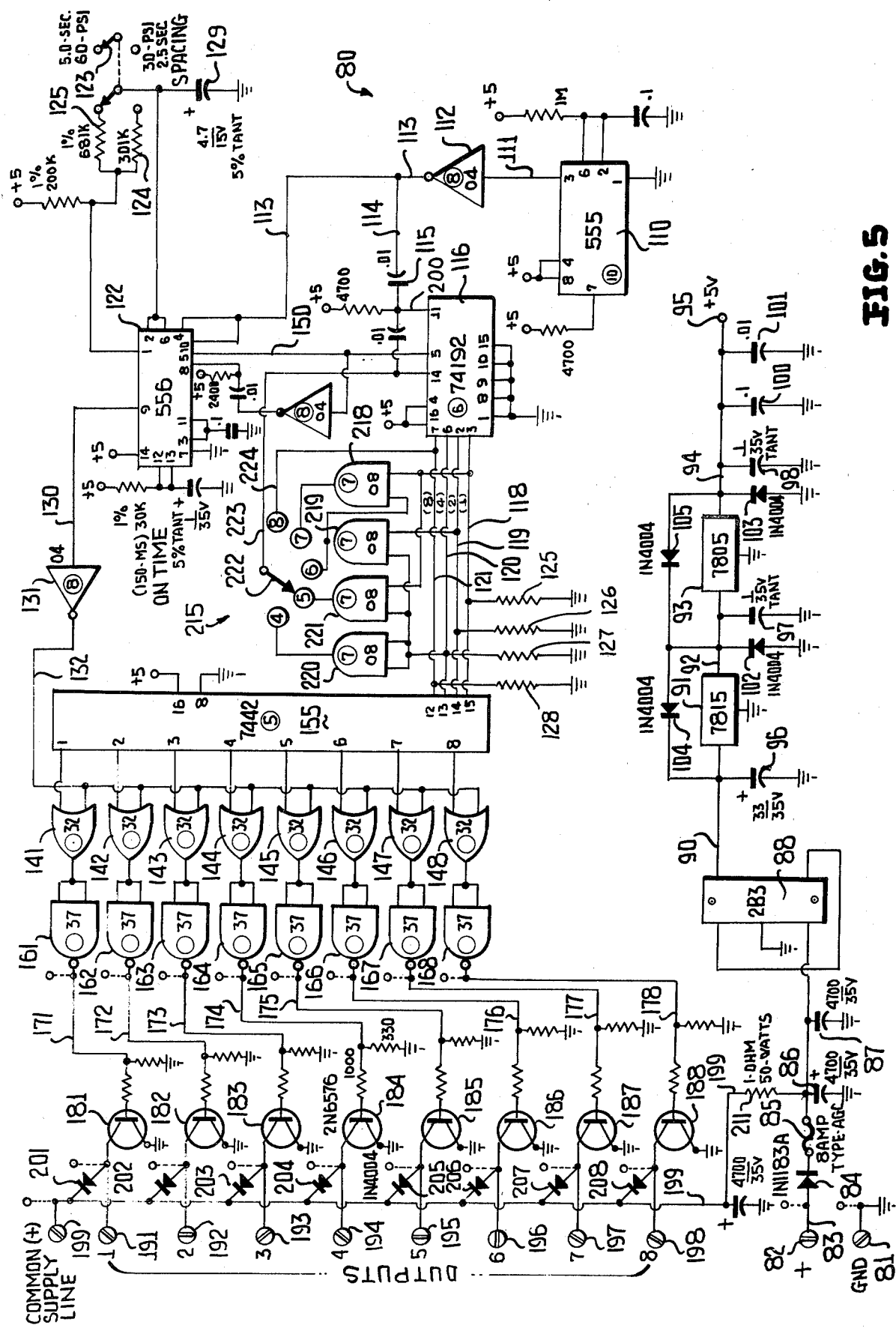
FIG. 5 is a sequence control circuit for the dust collector, and illustrates various subcircuits for selectively energizing solenoid controlled valves associated with air lines for cleaning dust from the filters.

Reference is made to the drawings which illustrate one specific application of the present invention relative to a typical mobile drilling machine or drilling rig which is generally designated by the reference numeral 10.

The drilling rig 10 includes a mobile vehicle 11 carrying a drilling tower 12 which is mounted in a conventional manner for movement between a generally horizontally disposed inoperative position (not shown) and a vertically disposed operative position. The drilling tower 12 includes a powered rotatable drilling shaft 13 whose lower end (unnumbered) carries a conventional drilling bit (also unnumbered) for drilling or boring into the earth or similar substrate S. A lower end portion (unnumbered) of the drill framework or drilling tower 12 carries dust collecting means in the form of a dust skirt 14 which defines an interior circular, rectangular or oval chamber 15 into which dust is gathered as drilling proceeds with the dust being generally mixed with air. An outlet opening (unnumbered) is formed at an end wall of the peripheral dust skirt or dust collector skirt 14 and is connected by a flexible conduit 16 to dust control apparatus or means including a relatively large dust collector or dust receiver 17 carried by the mobile vehicle 11.

The dust collector 17 defines a relatively large rectangular chamber 18 having an internal slanted bottom wall 20 which leads to an evacuation opening 21 and an exhaust hose 22 which simply opens to atmosphere. The dust generated during the drilling operation is drawn from the chamber 15 of the skirt 14 through the flexible hose or conduit 16 and into the dust chamber 18 of the dust collector 17 by means of a fan (not shown) within a blower housing 23 rotated by a conventional hydraulic motor 24. The blower housing 23 is connected to chamber 18 of the dust collector 17 through a plurality of filters 31, 32, 33, 34, etc.

As dust is drawn into the chamber 18 by the operation of the fan, the dust collects upon the outside of the conventional filter means or air filters 31, 32, 33, 34, etc. For purposes of simplification, four conventional air filters are shown and numbered, but the system can include anywhere up to sixty (60) filters which in size are approximately two feet across and anywhere from 1½ to 2 feet high. Above each of the filters 31 through 34, etc. is a high pressure outlet pipe 29, with its opening positioned to direct a blast of air into the hollow cores of filters 31 thorugh 34, etc., said outlet pipe 29 is also connected to a respective air valve 41 through 44, etc. which in turn is opened and closed by respective electrically operated solenoid valves 51 through 54, etc. The valves 41 through 44, etc. are pilot-operated air valves which operate through one air line per valve when the associated solenoid valves 51 through 54, etc. are energized. The air valves 41 through 44, etc. are each connected to a high pressure (60 psi) air line 60 which is in turn connected to a suitable high pressure source of air, such as a conventional air compressor C (FIG. 1) carried by the mobile vehicle 11. As the bit of the drill 13 creates dust, the same is drawn into the interior chamber 18 by the fan and collects upon the filters 31 through 34, etc., as was heretofore noted. After a predetermined time period, the solenoid valves 51 through 54, etc. are actuated at a preset time and in a preset sequence between times which causes selective and/or sequential opening of the air valves 41, 42, 43, 44, etc., whereupon air from the air line 60 flows into the interior of the filters 31 through 34, etc. through the associated high pressure outlet pipe 29 creating a sudden blast of air interiorly of these filters which blows the excess dust collected thereupon off the outer surfaces of filters 31 through 34, etc. The dust drops downwardly upon the slanted bottom 20 of the dust collector 17 and outwardly to atmosphere through the opening 21 and the hose 22 associated therewith. Thus, as the dust is drawn into the chamber 18, it is collected on the filters 31, 32, 33, 34, etc. and is then "blasted" off the filters 31 through 34, etc. by a pulse of 60 psi air pressure and harmlessly drops therefrom to the bottom wall 20 and outwardly of the dust collector 17 through the opening 21 and hose 22. The dust simply collects in a pile on the ground where it might be collected, trucked away and safely discarded.

The operation of the solenoid valves 51 through 54, etc., and thus the introduction of the high pressure air from the air line 60 into the filters 31, 32, 33, 34, etc. is through a control mechanism which is generally designated by the reference numeral 70 and includes as a major component circuit means in the form of an electronic circuit 80 to which reference is now specifically made.

The circuit or sequence control circuitry 80 is energized by a D.C. power source (not shown) which might be simply a set of batteries (12 volts or 24 volts) which are charged by an alternator A (FIG. 1) or, in some cases, a D.C. generator (not shown) carried by the mobile vehicle 11. The circuitry 80 for controlling the solenoid valves 51 through 54, etc. can operate either on 12 or 24 volts and is specifically designed for a maximum input voltage of 30 volts. Irrespective of the particular voltage of the power source, the same is connected to a ground terminal 81 and a positive terminal 82 of the sequence control circuitry 80. The terminals 81, 82 are conventional screw terminals forming part of a circuit board assembly measuring 9¼ inches by 7 inches and having a thickness of 0.093 inch. The circuit board (not shown) is made of G-10 epoxy-glass material which is extremely strong and, when utilized with rubber isolation or shock mounts and a NEMA-4 box (not shown), will operate effectively for years with no problem of cracking because of vibration, temperature, etc. The circuit board itself is mounted within the latter-noted box and is part of the control mechanism 70 which is positioned on the mobile vehicle 11.

The positive terminal 82 includes a line 83 connected to a power rectifier 84 which protects the circuit 80 against reverse polarity should the negative and positive terminals 81, 82, respectively, be incorrectly connected to the positive and negative sides, respectively, of the 12 or 24 volt power source.

The line 83 includes an 8 amp fuse and two capacitors 86, 87 connected to ground. The line 83 is connected to a conventional line filter 88 which functions to prevent transient voltage spikes from being introduced into the logic system of the sequence control circuitry 80 to be described more fully hereinafter. The line filter 88 is utilized simply because if the system is charged by either an alternator or generator, there is a very good possibility that transient voltages will be introduced into the circuitry but will not pass beyond the line filter 88 and, therefore, will not cause circuit 80 to false operate or be damaged due to transient voltage spikes introduced at the power source.

An output line 90 of the transient filter 88 is connected to a conventional voltage regulator 91. The voltage regulator 91 is a 15 volt regulator and, thus, if the input over the line 90 is 24 volts, for example, the output from the regulator 91 at line 92 would be 15 volts regulated D.C. The 15 volts in turn are connected to a 5 volt voltage regulator 93 and, therefore, the output of the latter over line 94 is 5 volts at an output voltage terminal 95. The voltage regulators 91, 93 are mounted on a common heat sink which is electrically grounded. The purpose of the regulators 91, 93, as opposed to a single voltage regulator dropping the 24 volts immediately down to +5 volts in one step, is to compensate for heat dissipation and by first passing the voltage through the 15 volt regulator 91 and then the 5 volt regulator 93, the generated heat is thus cut in half by the stepped reduction of voltage. The heat sink is nothing more than a conventional aluminum extrusion measuring 2⅛ inches by 3 inches to which the voltage regulators 91, 93 are connected with their leads passing through holes in the heat sink and being soldered to a bottom surface of the circuit board (not shown).

In front of, between and behind the voltage regulators 91, 93 are capicators 96, 97, 98, 100, and 101 which reduce transient voltage spikes. Four rectifiers 102 through 105 are also included in the circuit to provide reverse voltage protection on the input and short circuit protection on the output of associated voltage regulators 91, 93. The result is an output at the output terminal 95 of +5 volts regulated D.C. power with no transient voltages coming through. Since the basis of the sequence control circuit 80 is TTL logic, a well regulated, transient free, +5 volts D.C. is required.

The circuit 80 further includes an automatic power-on reset function that resets the overall TTL portion of the circuit 80. When power is applied to the input terminals 81 and 82, the timer chip 110 turns on for 100 milliseconds, one time only, then turns off, providing a 100 millisecond high (positive) pulse at its output pin 3 which is connected to inverter 112 through line 111.

Since the output of the inverter 112 will always be opposite the input, a low reset pulse is generated at the output of inverter 112 onto lines 113, 114 and through an associated capacitor 115. The reset pulse is, therefore, capacitively coupled to the load input pin 11 of a conventional up/down decade counter 116 through capacitor 115.

With the pins 1, 9, 10 and 15 of the counter 116 wired as shown, the counter will internally load number zero when pin 11 receives the reset pulse. The counter 116 will subsequently preset the internal number on the output lines 118, 119, 120 and 121 in the format of binary coded numbers (1), (2), (4) and (8), respectively. The reset pulse from inverter 112 is directly connected through line 113 to input pins 4 and 10 of another timer 122 which is a dual timer chip corresponding essentially to a dual version of the timer 110. The timer 122 contains two conventional timer circuits on a single chip with each timer having completely independent control pins and independent output pins. One half of the timer 122 is wired as an oscillator with pin 5 being its output, while the other half of timer 122 is wired as a pulse generator with pin 9 being its output. The reset pulse from the inverter 112 is connected to pins 4 and 10 of timer 122 through line 113 forcing the timer 122 to become nonfunctional for the duration of the reset pulse. As a result, the power-on reset pulse which is produced by the output of timer 110, when power is applied thereto, resets the counter 116 to zero and prevents the oscillator and pulse generator circuits in timer 122 from functioning for 100 milliseconds, essentially reseting the TTL portion of circuit 80 to a starting point.

The circuit 80 is designed for operation in conjunction with not only 60 psi air pressure, as heretofore described relative to the air line 60, but also for use with 30 psi air pressure over the air line 60. A switch 123 is shown set at the 60 psi position, but the same is in no way connected to the air line 60 or the pressure source, but is simply a generic representation to the operator as to where the switch 123 should be set depending upon the line pressure available in the air line 60. The two positions of the switch 123 simply mean that if air is available on the drilling rig at 60 psi, the solenoid valves 51 through 54, etc. should be pulsed 5 seconds apart to discharge the dust therefrom, and the switch 123 as set will accomplish this purpose through the circuitry 80. In this setting, the final output pulses to the solenoid valves 51, 52, 53, 54, etc. will be spaced 5 seconds apart, or, stated otherwise, there is 5 seconds between pulses supplied to the solenoid valves 51 through 54, etc., as will be described more fully hereinafter. If the switch 123 is moved to the lower position (30 psi), the timed spacing between output pulses to the solenoids 51, 52, 53, 54, etc. is 2.5 seconds. The reason for the latter is that the lower pressure will require an air blast at the filters 31, 32, 33, 34, etc. twice as often in order to free the dust therefrom.

The two switch positions of the switch 123 are connected alternately to two different resistors 124 and 125', each of which connects to the 1 pin and also connects to the 2 and 6 pins of the timer 122, which functions as an oscillator through capacitor 129 connected to ground. The other half of the timer 122, which also functions as an oscillator, is used for generating on-time pulses and includes an output line 130 from pin 9 to the input of inverter 131 connected by line 132 to each of eight OR gates 141 through 148. The 5 pin of the timer 122 is also an output which is controlled by the 30 psi or 60 psi setting of the switch 123 and is also connected by line 150 to the 5 pin, which is the input of the counter 116. Therefore, whether the pulses are spaced 5 seconds apart or 2.5 seconds apart, the pulses are delivered over the line 150 to the counter 116 to pulse the same internally with the pulses being converted by the counter 116 to binary format over the lines 118, 119, 120, and 121 having outputs connected to respective input pins 15, 14, 13, and 12 of the decoder 155 which is a conventional BCD-to-Decimal decoder. Thus, if the binary (1) line, which is line 118, goes high and the remaining lines 119, 120 and 121 are low, the decoder 155 will decode the same to drive its output pin 1 low, while the remaining output pins 2 through 7 and pin 9 are high. Pin 8 of the decoder 155 is not an output pin but instead a power supply connection which is connected to ground. If the binary (2) line, which is line 119, goes high and the remaining output lines 118, 120 and 121 are low, the decoder 155 will decode the same to drive its output pin 2 low, while the remaining output pins 1 and 3 through 7 and pin 9 are high. Similarly, if the lines 118 and 119 from the counter 116 are high, then only the output pin 3 of decoder 155 goes low, while if line 120 is high, an output low will result at pin 4 of decoder 155. Similarly, for low output conditions at pins 5 through 8 of the decoder 155, high line conditions are passed by the counter 116 to the decoder 155 over lines 118, 120; 119, 120; 118, 119, 120; and 121 only, respectively. Accordingly, each time the counter 116 is pulsed by the timer 122, the counter 116 advances the count to the next highest number internally and sequentially passes the information to the decoder 155 through lines 118, 119, 120 and 121 in the format of a binary code. Lines 118 through 121 are also connected to ground through resistors 125, 126, 127 and 128, respectively, to insure that each line is maintained at a low condition until driven high by the counter 116.

Each of the OR gates, 141 through 148 will provide a low output when both of its inputs are low. Therefore, when the OR gate 141 is enabled by output pin 1 of the decoder 155, the OR gate 141 will produce a low output pulse when the remaining input of the OR gate 141 is driven low by the pulse generation section of the timer 122 through inverter 131 over line 132, with the duration of the pulsed output of the OR gate 141 being determined by the pulse generation section of timer 122. Thus, the decoder 155 selects an appropriate one of the OR gates 141 through 148 to be pulsed and the common line 132 to the OR gates 141 thorugh 148 provides an on-time pulse of 150 milliseconds at the output of the selected OR gate.

The outputs of the OR gates 141 through 148 are connected to respective NAND gates 161 through 168 which, since both inputs are wired together, simply act as inverters. Thus, if the inputs over the unnumbered lines through the NAND gates 161 through 168 go low (negative), the output over the respective lines 171 through 178 go high to respectively turn on Darlington transistors 181 through 188. Since the NAND gates 161 through 168 are buffers, they provide higher current outputs then a normal NAND gate, and are used to insure turn-on of transistors 181 through 188 which function as solid state switches for the inductive loads associated with the solenoids 51, 52 53, 54, etc. to which outputs 191 through 198 from the transistors 181 through 188, respectively, are connected along with, of course, a common + supply line or terminal 199. In other words, the output 191 and the common + supply terminal 199 are connected to the solenoid valve 51 and when the sequence control circuit 80 energizes the transistor 181, the solenoid 51 operates to open the valve 41 sending a blast of 60 psi air from the pipe 60 into the filter 31 to blow the dust therefrom. Similarly, the output 192 and the common + supply terminal 199 are connected to the solenoid valve 52, and this sequence of connection is repeated for the solenoid valves 53, 54 and all remaining unillustrated solenoid valves, their associated air valves and the filters relative thereto. Thus, when the digital logic sequencing circuit 80 provides an appropriate pulse command to turn on a particular transistor 181 through 188, the same conducts power to the associated solenoid valve 51, 52, 53, 54, etc., and the transistors 181 through 188 turn on for 150 milliseconds and then turn off.

A diode 201 through 208 is connected between each output line of the respective transistors 181 through 188 and the associated common + supply terminal 199 to prevent reverse voltage from damaging the transistors 181 through 188 when they turn off. As was heretofore noted, since the solenoid valves 51, 52, 53, 54, etc. include a solenoid and an associated coil which creates an inductive load, they also store a certain amount of energy, and when the power is cut off, there occurs an inductive kick (reverse voltage) resulting from the collapsing of the magnetic field, and the diodes 201 through 208 simply serve a protection function.

The line or terminal 199, which supplies the power to all of the solenoids 51, 52, 53, 54, etc., includes a 1 ohm 50 watt resistor 211 to prevent damaging transistors 181 through 188 if, for example, an operator inadvertently wires the circuit incorrectly and wires the terminal 191 directly to the common + supply terminal 199 which would be a dead short, or, if one of the solenoids of the solenoid valves 51, 52, 53, 54, etc. were dead shorted. In either case, a dead short would be conducted through the associated transistor 181 through 188 which might normally blow the same, but the voltage instead goes through the resistor 211 and since this voltage is only in for 150 milliseconds, it can not hurt any of the transistors but will pass through the resistor 211 and blow the fuse 85. Since the fuse is rated at 8 amps and the transistors 181 through 188 are rated in the order of 20 amps, the transistors 181 through 188 can withstand the amount of current required to blow the fuse 85. Therefore, in effect what occurs during the occurence of a dead short is that the fuse 85 is blown but none of the transistors 181 through 188 are damaged which, in effect, makes the output of the circuit 80 absolutely blowout proof.

As was also noted earlier, the output of the capacitors 86 and 87 keeps a steady state voltage on the + supply line or terminal 199 through resistor 211 and also maintains a steady voltage on these same capacitors to energize the solenoid valves 51, 52, 53, 54, etc., upon demand from their associated transistors 181, 182, 183, 184, etc. Therefore, rather than simply using the input voltage, be it 12 or 24 volts, the very rapid capacitive discharge of the capacitors 86, 87 at a relatively high microfarad level results in a high powered, rapid movement of the solenoid coils and, therefore, a rapid and positive operation of the valves 41, 42, 43, 44, etc. associated therewith.

The circuit 80 also includes a sequence select circuit means 215 formed by four AND gates 218 through 221 having inputs connected as shown to selected ones of the output lines 118, 119 and 120 of the counter 116 and to each other. The outputs of the AND gates 218 through 220 are connected to selected terminals numbered 4 through 8 having a movable selector switch 222 connected by line 223 to pin 14 of the counter 116. A line 224 is connected directly from the line 121 to the output terminal 8 of the sequence select circuit 215. The wiring between the lines 118 through 120 and the AND gates 218 through 221 is simply to decode the binary signals passing along the lines 118 through 121 from the counter 116 to the decoder 155. When the AND gates 218 through 221 read the same output from the counter 116 as set by the switch 222, a pulse travels through the line 223 to the clear terminal or pin 14 of the counter 116 which resets the counter 116. For example, in the illustrated case the switch 222 is set at its "5" sequence and when the counter 116 counts up to the fifth sequence, nothing happens, but when the output of lines 118 and 120 go low at the end of the fifth sequence, a low pulse is generated from the output of the AND gate 221, through switch 222, over line 223 back to the 14 pin of the counter 116 resetting the counter 116 back to zero which is capacitively coupled back to the pin 11 over the line 200 which is the load command line for the counter 116, which internally reloads the counter to number "1". Thus, the AND gates 218 through 221 read the binary signals of lines 118 through 121 and after a particular number (5 in the example) is read or goes high and then returns low again, prior to reading the next number from the counter 116, the low transistion or pulse triggers the reset and load pins of the counter 116 over the lines 223 and 200, respectively.

Therefore, the circuitry just described provides a plurality of outputs in controlled sequence through the timer 122 generating successive timing pulses which the counter 116 delivers in binary outputs over the lines 118 through 121 which are decoded by decoder 155 and used to enable a plurality of OR gates 141 through 148 with the output of the latter being controlled timewise by the output delivered over the line 132 to energize a particular one of the transistors 181 through 188 and, therefore, the solenoid valves 51, 52, 53, 54, etc., associated therewith. Furthermore, the counter 116 can be selectively reset by the selector means 215 by simply changing the position of the arm 222 and thus alter the sequence output of the signals from the decoder 155. In this manner, the overall dust control apparatus 10 accomplishes the functions heretofore described and achieves the benefits latter-enumerated.

Although only a preferred embodiment of the invention has been specifically illustrated and described herein, it is to be understood that minor variations may be made in the apparatus without departing from the spirit and scope of the invention, as defined in the appended claims.

I claim:

1. Dust control apparatus comprising means for collecting dust as it is being formed by a drill adjacent an associated bore hole, means for receiving dust from said dust collecting means, said dust receiving means including a chamber, filter means in said chamber for collecting dust received therein, air pressure means connected to said filter means for delivering air pressure to said filter means for cleaning the dust therefrom, circuit means for selectively controlling the sequential operation of said air pressure means to deliver same to the filter means at predetermined intervals to clean the dust therefrom at such predetermined intervals, discharge means for removing dust from said chamber, said filter means comprising a plurality of filters positioned in said chamber, said apparatus further including an electronically controlled valve positioned and arranged between each of said filters and said air pressure means for delivering air pressure from said air pressure means to each of said filters, said circuit means including oscillator means for developing spaced predetermined pulses, said circuit means further including counter means receiving said predetermined pulses and developing reoccurring groups of coded pulses corresponding in number to the plurality of filters, said circuit means also including decoder means for developing a single output drive pulse from each group of coded pulses corresponding to the particular filter to be cleaned, and said circuit means including means for delivering each particular output drive pulse to one of said electronically controlled valves for delivering air pressure from said air pressure means to one of said filters, said circuit means including timing means for developing on-time pulses each of a predetermined duration, said circuit means including means for controlling the delivery time of the output drive pulse and said circuit means further including means for varying the spacing between each of said on-time pulses in relation to the pressure supplied by said pressure means.

2. The dust control apparatus as defined in claim 1 wherein said circuit means includes means for combining a stored capacitive charge with said decoder means to provide an unusually strong means of energizing said electronically controlled valve.

3. The dust control apparatus as defined in claim 2 wherein said circuit means includes means for varying the time spacing between said predetermined pulses.

4. The dust control apparatus as defined in claim 2 wherein said circuit means includes means for selectively resetting said counter means depending upon a preselected number of said groups of coded pulses developed by said counter means.

5. The dust control apparatus as defined in claim 2 wherein said circuit means includes means for selectively resetting said counter means depending upon a preselected number of said groups of coded pulses developed by said counter means, said circuit means includes switch means for selectively establishing said predetermined number within the total number of said filters, said switch means including a plurality of gate means having input means connected to said counter means for reading the groups of coded pulses, each gate means having an output indicative of a particular one of said groups, a switch arm selectively connected to any one of said gate means outputs, and said switch arm also being connected to a reset input of said counter means.

6. The dust control apparatus as defined in claim 1 wherein said circuit means includes means for varying the predetermined spacing between said predetermined pulses.

7. The dust control apparatus as defined in claim 1 wherein said circuit means includes means for selectively resetting said counter means depending upon a preselected number of said groups of coded pulses developed by said counter means.

8. The dust control apparatus as defined in claim 1 wherein said circuit means includes means for selectively resetting said counter means depending upon a preselected number of said groups of coded pulses developed by said counter means, and said circuit means also includes switch means for selectively establishing said predetermined number within the total number of said filters.

9. The dust control apparatus as defined in claim 1 wherein said delivering means includes a transistor connected to each electronically controlled valve, a power source also connected to each electronically controlled valve, and said circuit means includes means between said power source and each transistor for preventing reverse voltage from damaging said transistor.

10. The dust control apparatus as defined in claim 1 wherein said circuit means includes means for selectively resetting said counter means depending upon a preselected number of said groups of coded pulses developed by said counter means, said circuit means includes switch means for selectively establishing said predetermined number within the total number of said filters, said switch means includes a plurality of gate means having input means connected to said counter means for reading the groups of coded pulses, each gate means having an output indicative of a particular one of said gate means outputs, and said switch means includes a switch arm connected to a reset input of said counter means.

* * * * *